(12) United States Patent
Edwards et al.

(10) Patent No.: US 10,716,167 B2
(45) Date of Patent: Jul. 14, 2020

(54) CELLULAR NETWORK COVERAGE USING A VEHICLE-BASED DATA TRANSMISSION EXTENDER

(71) Applicant: TOYOTA MOTOR NORTH AMERICA, INC., Plano, TX (US)

(72) Inventors: Michael C. Edwards, McKinney, TX (US); Gopal Kalaimani Senthilkumar, Frisco, TX (US); Neil Dutta, Addison, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/203,950

(22) Filed: Nov. 29, 2018

(65) Prior Publication Data
US 2020/0178349 A1 Jun. 4, 2020

(51) Int. Cl.
| | |
|---|---|
| H04W 88/04 | (2009.01) |
| H04M 15/00 | (2006.01) |
| H04M 15/12 | (2006.01) |
| H04W 16/26 | (2009.01) |
| H04W 4/24 | (2018.01) |
| H04W 8/00 | (2009.01) |
| H04W 4/44 | (2018.01) |

(52) U.S. Cl.
CPC ........... *H04W 88/04* (2013.01); *H04M 15/12* (2013.01); *H04M 15/8214* (2013.01); *H04W 4/24* (2013.01); *H04W 4/44* (2018.02); *H04W 8/005* (2013.01); *H04W 16/26* (2013.01)

(58) Field of Classification Search
CPC ....... H04W 88/04; H04W 4/44; H04W 8/005; H04W 4/24; H04W 16/26; H04M 15/12; H04M 15/18214; H04M 15/8214
See application file for complete search history.

(56) References Cited

U.S. PATENT DOCUMENTS

| | | | |
|---|---|---|---|
| 7,003,261 | B2 | 2/2006 | Dietz et al. |
| 9,831,980 | B2 | 11/2017 | Hayman |
| 9,973,386 | B2 | 5/2018 | Barros et al. |

(Continued)

FOREIGN PATENT DOCUMENTS

| | | |
|---|---|---|
| CN | 104811940 A1 | 7/2015 |
| FR | 2988937 A1 | 10/2013 |
| WO | 2017157558 A | 9/2017 |

*Primary Examiner* — Brandon J Miller
(74) *Attorney, Agent, or Firm* — Haynes & Boone, LLP (57) ABSTRACT

Apparatus, systems, and methods for improving cellular network coverage using a vehicle-based data transmission extender. One such generalized method includes establishing communication between a fixed base station of a cellular network and a first wireless device, which includes a data transmission module that is part of a first vehicle. Data is relayed between the fixed base station and a second wireless device using the first wireless device to extend geographic coverage of the cellular network to the second wireless device. The method also includes at least one of: detecting, using a signal detector, a signal emitted from the second wireless device, the signal detector being part of the first vehicle; and tracking, using a data meter, an amount of data relayed via the first wireless device between the fixed base station and the second wireless device over the cellular network, the data meter being part of the first vehicle.

18 Claims, 5 Drawing Sheets

(56) References Cited

U.S. PATENT DOCUMENTS

| | | | |
|---|---|---|---|
| 9,979,790 B1* | 5/2018 | Park | H04W 76/10 |
| 10,506,394 B2* | 12/2019 | Chun | H04W 8/22 |
| 2004/0192193 A1* | 9/2004 | Silvester | H04B 7/155 |
| | | | 455/11.1 |
| 2013/0095786 A1* | 4/2013 | Bradburn | H04W 88/04 |
| | | | 455/406 |
| 2013/0204943 A1* | 8/2013 | Ricci | G06F 3/0484 |
| | | | 709/204 |
| 2014/0242904 A1* | 8/2014 | Pandey | H04B 7/24 |
| | | | 455/39 |
| 2016/0113043 A1 | 4/2016 | O'Brien et al. | |
| 2017/0015263 A1* | 1/2017 | Makled | B60R 21/00 |
| 2017/0150531 A1 | 5/2017 | Horbatt | |
| 2018/0091985 A1 | 3/2018 | Thanayankizil et al. | |
| 2018/0262367 A1* | 9/2018 | Alieiev | H04W 24/10 |
| 2019/0088041 A1* | 3/2019 | Lee | G07C 5/008 |
| 2019/0158993 A1* | 5/2019 | Kwon | H04L 5/001 |
| 2019/0166486 A1* | 5/2019 | Tang | H04W 88/04 |

* cited by examiner

CELLULAR NETWORK COVERAGE USING A VEHICLE-BASED DATA TRANSMISSION EXTENDER

TECHNICAL FIELD

The present disclosure relates generally to wireless networks and, more particularly, to apparatus, systems, and methods for improving cellular network coverage using a vehicle-based data transmission extender.

BACKGROUND

Existing cellular network technologies are susceptible to poor coverage and/or blockage issues, including cellular dead spots, which can present problems when cellular connectivity is urgently needed. More particularly, there may be urgent situations (e.g., emergency situations and important calls) that are best addressed by phone calls when traveling in a vehicle. However, the occupants of such a vehicle may be put in danger or otherwise inconvenienced if an urgent situation arises while the vehicle travels over a road with cellular dead spots, because the ability of the occupants to communicate with the outside world using a mobile device may be limited or temporarily unavailable. Some cellular network technologies may be more susceptible to poor coverage and/or blockage issues than others. For example, because 5G operates in a wavelength more susceptible to blockage than LTE or other 4G technologies, 5G requires additional and closer placed base stations to provide the same level of service coverage. It would therefore be desirable to extend the coverage of one or more cellular networks to remote areas where data service is not as prevalent, or to provide better data service in high-blockage areas. Therefore, what is needed is an apparatus, system, or method that addressed on or more of the foregoing issues, and/or one or more other issues.

SUMMARY

The present disclosure provides apparatus, systems, and methods for improving cellular network coverage using a vehicle-based data transmission extender. A generalized method includes establishing communication between a fixed base station of a cellular network and a first wireless device. Data is relayed between the fixed base station and a second wireless device using the first wireless device to extend geographic coverage of the cellular network to the second wireless device. The first wireless device includes a first vehicle-based data transmission module that is part of a first vehicle. The method also includes at least one of: detecting, using a signal detector, a signal emitted from the second wireless device, the signal detector being part of the first vehicle; and tracking, using a data meter, an amount of data relayed via the first wireless device between the fixed base station and the second wireless device over the cellular network, the data meter being part of the first vehicle.

A generalized system includes a fixed base station of a cellular network and a first wireless device including a first vehicle-based data transmission module that is part of a first vehicle. The first wireless device is adapted to: communicate with the fixed base station; and relay data between the fixed base station and a second wireless device to extend geographic coverage of the cellular network to the second wireless device. The system may also include the second wireless device and at least one of: a signal detector adapted to detect a signal emitted from the second wireless device, the signal detector being part of the first vehicle; and a data meter adapted to track an amount of data relayed via the first wireless device between the fixed base station and the second wireless device over the cellular network, the data meter being part of the first vehicle.

A generalized apparatus includes a non-transitory computer readable medium and a plurality of instructions stored on the non-transitory computer readable medium and executable by one or more processors. The plurality of instructions include instructions that, when executed, cause the one or more processors to establish communication between a fixed base station of a cellular network and a first wireless device. The plurality of instructions also include instructions that, when executed, cause the one or more processors to relay, using the first wireless device, data between the fixed base station and a second wireless device to extend geographic coverage of the cellular network to the second wireless device. The first wireless device includes a first vehicle-based data transmission module that is part of a first vehicle. The plurality of instructions also include at least one of: instructions that, when executed, cause the one or more processors to detect, using a signal detector, a signal emitted from the second wireless device, the signal detector being part of the first vehicle; and instructions that, when executed, cause the one or more processors to track, using a data meter, an amount of data relayed via the first wireless device between the fixed base station and the second wireless device over the cellular network, the data meter being part of the first vehicle.

DETAILED DESCRIPTION

The present disclosure provides apparatus, systems, and methods for improving cellular network coverage (e.g., for a cellular network service provider) using a vehicle-based data transmission extender (or another powered relay). The vehicle-based data transmission extender may include vehicle-carried transceivers/relays that become mobile hotspots to extend cellular network coverage to remote areas where data service is not as prevalent, or to provide better data service in high-blockage areas. Because 5G operates in a wavelength more susceptible to blockage than LTE or other 4G technologies, 5G requires additional and closer placed base stations to provide the same level of service coverage. Accordingly, in some embodiments, the vehicle-based data transmission extender of the present system may be utilized to extend 5G cellular network coverage beyond the fixed base stations of a particular service provider. For example, the vehicle-based data transmission extender may utilize vehicle-to-vehicle or vehicle-to-infrastructure communication to improve consumers' cellular network coverage. In some instances, since the present system utilizes mobile vehicles, the vehicle-based data transmission extender may be considered a mobile base station of the cellular network. Such a mobile base station (whether moving or stationary) is capable of relaying signals from another base station (e.g., fixed or mobile) to expand the coverage area of the cellular network.

Example hardware may include: a tower with a cellular antenna; a vehicle with an enabled vehicle-based data transmission extender (or another powered relay); and a mobile device utilizing a cellular data service (e.g., 5G, 4G, LTE, etc.), which consumer device may be located proximate the vehicle. Specifically, the consumer device may be associated with an occupant of the vehicle having the enabled vehicle-based data transmission extender. Alternatively, the consumer device may be associated with an occupant of another vehicle traveling nearby (e.g., in the same direction). As a result, the vehicle with the enabled vehicle-based data transmission extender becomes part of the mobile backbone of a cellular network service. Example software may include tracking software that tracks the amount of data flowing through the vehicle-based data transmission extender. In some instances, because the vehicle-based data transmission extender provides network providers (e.g., Verizon, AT&T, etc.) with additional range and capacity, vehicle owners and/or manufacturers may charge the network providers usage fees based on the tracked usage of the vehicle-based data transmission extender as part of the service providers' networks.

In some implementations, data analytics may be used to continuously collect information from a plurality of vehicles, at least some of which are equipped with the enabled vehicle-based data transmission extender (or another powered relay), and at least some of which are not equipped the enabled vehicle-based data transmission extender. More particularly, using a signal detector located in each of the vehicles, the presence or absence of a mobile device in or around each of the plurality of vehicles is detected (e.g., via low frequency mobile phone signals). In some embodiments, when a mobile device is detected by the signal detector of one of the vehicles equipped with the enabled vehicle-based data transmission extender, that vehicle's data transmission extender is used to extend cellular network coverage to the detected mobile device. On the other hand, in some embodiments, when a mobile device is detected by the signal detector of one of the vehicles not equipped with the enabled vehicle-based data transmission extender, a nearby vehicle that is equipped with the enabled vehicle-based data transmission extender is used to extend cellular network coverage to the detected mobile device.

Machine learning may be used in combination with the above-described data analytics to construct comprehensive profiles based on: (i) detected mobile device usage in vehicles equipped with the signal detector; (ii) vehicles equipped with the enabled vehicle-based data transmission extender (or another powered relay) and thus able to extend cellular network coverage to detected mobile devices; (iii) vehicles not equipped the enabled vehicle-based data transmission extender and thus unable to extend cellular network coverage to detected mobile devices; and (iv) known dead spots in the cellular network (i.e., locations or geographic zones where the fixed base stations of a particular service provider do not provide coverage). Based on these comprehensive profiles, trends are identified for instances where one or more of the vehicles equipped with the enabled vehicle-based data transmission extender can constructively impart, extend, and/or add network connectivity when one or more mobile devices are detected. In some embodiments, the provided network connectivity temporarily adds more network bandwidth in a cellular dead spot at a frequency commonly shared between the one or more of the detected mobile devices and the one or more of the enabled vehicle-based data transmission extenders. Machine learning may be further leveraged to determine how effectively particular vehicle(s) equipped with the enabled vehicle-based data transmission extender adds network bandwidth in the cellular dead spot; based on the effectiveness (or lack thereof) of the particular vehicle(s) at adding network bandwidth, the machine learning server may be validated or refined to select for use an appropriate vehicle equipped with the enabled vehicle-based data transmission extender from among the plurality of vehicles.

Figure 1:
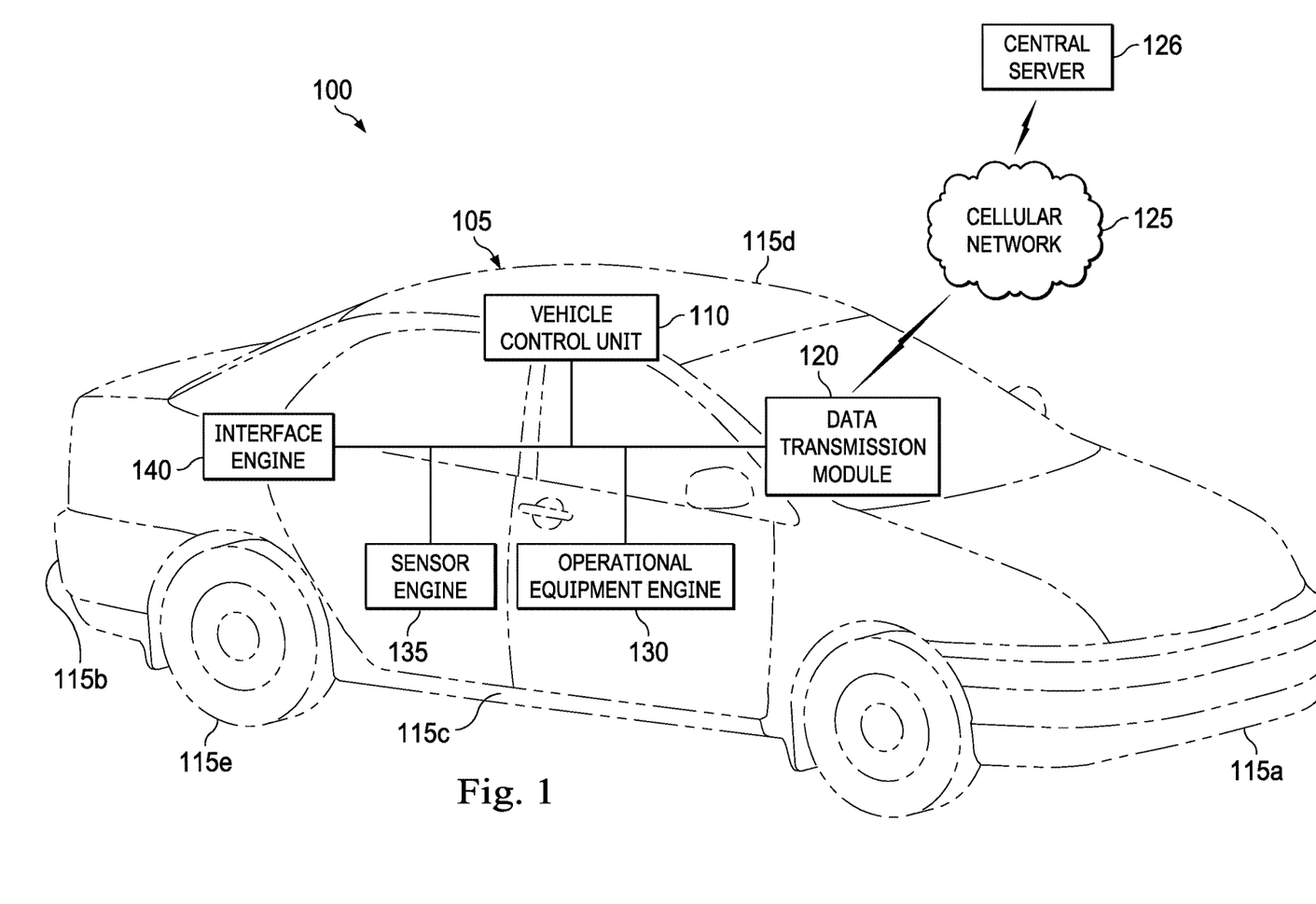
FIG. 1 is a diagrammatic illustration of a vehicle-based transmission extender apparatus, according to one or more embodiments of the present disclosure.

Referring to FIG. 1, in an embodiment, a vehicle-based data transmission extender apparatus is generally referred to by the reference numeral 100 and includes a vehicle 105, such as an automobile, and a vehicle control unit 110 located on the vehicle 105. The vehicle 105 may include a front portion 115a (including a front bumper), a rear portion 115b (including a rear bumper), a right-side portion 115c (including a right front quarter panel, a right front door, a right rear door, and a right rear quarter panel), a left-side portion 115d (including a left front quarter panel, a left front door, a left rear door, and a left rear quarter panel), and wheels 115e. A data transmission module 120 is operably coupled to, and adapted to be in communication with, the vehicle control unit 110. The data transmission module 120 is adapted to communicate wirelessly with, and form a part of, a cellular network 125 (e.g., a 3G network, a 4G network, a 5G network, a Wi-Fi network, an ad hoc network, or the like). In some embodiments, a central server 126 is adapted to communicate with the vehicle 105 via the cellular network 125.

An operational equipment engine 130 is operably coupled to, and adapted to be in communication with, the vehicle control unit 110. A sensor engine 135 is also operably coupled to, and adapted to be in communication with, the vehicle control unit 110. The sensor engine 135 is adapted to monitor various components of, for example, the operational equipment engine 130 and/or the surrounding environment, as will be described in further detail below. An interface engine 140 is also operably coupled to, and adapted to be in communication with, the vehicle control unit 110. In addition to, or instead of, being operably coupled to, and adapted to be in communication with, the vehicle control unit 110, the data transmission module 120, the operational equipment engine 130, the sensor engine 135, and/or the interface engine 140 may be operably coupled to, and adapted to be in communication with, one another via wired or wireless communication (e.g., via an in-vehicle network). In some embodiments, as in FIG. 1, the vehicle control unit 110 is adapted to communicate with the data transmission module 120, the operational equipment engine 130, the sensor engine 135, and the interface engine 140 to at least partially control the interaction of data with and between the various components of the vehicle-based data transmission extender apparatus 100.

The term "engine" is meant herein to refer to an agent, instrument, or combination of either, or both, agents and instruments that may be associated to serve a purpose or accomplish a task—agents and instruments may include sensors, actuators, switches, relays, power plants, system wiring, computers, components of computers, programmable logic devices, microprocessors, software, software routines, software modules, communication equipment, networks, network services, and/or other elements and their equivalents that contribute to the purpose or task to be accomplished by the engine. Accordingly, some of the engines may be software modules or routines, while others of the engines may be hardware and/or equipment elements in communication with the vehicle control unit 110, the data transmission module 120, the cellular network 125, and/or the central server 126.

Figure 2:
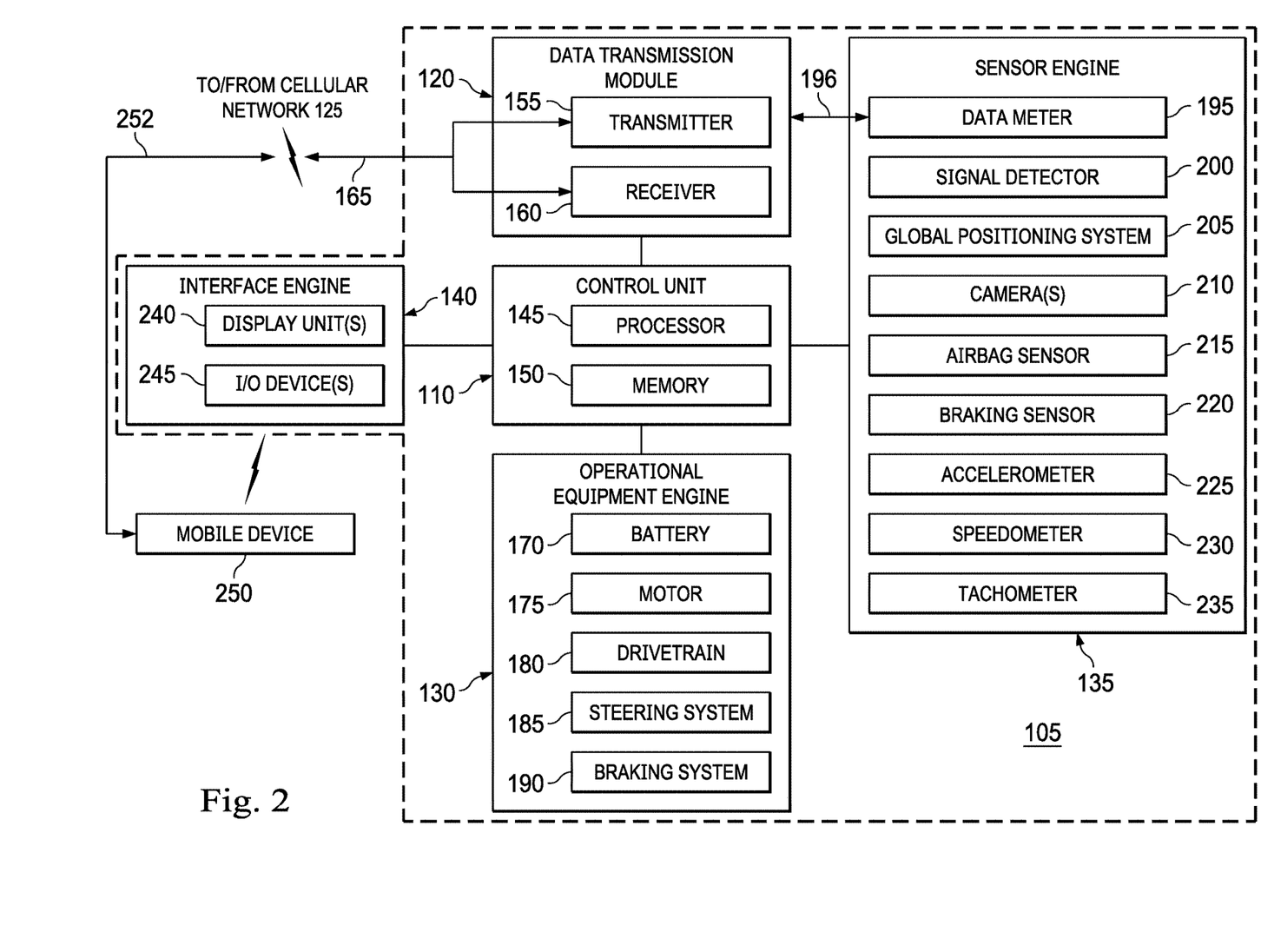
FIG. 2 is a detailed diagrammatic view of the vehicle-based transmission extender apparatus of FIG. 1, according to one or more embodiments of the present disclosure.

Referring to FIG. 2, a detailed diagrammatic view of the vehicle-based data transmission extender apparatus 100 of FIG. 1 is illustrated. As shown in FIG. 2, the vehicle control unit 110 includes a processor 145 and a memory 150. In some embodiments, as in FIG. 2, the data transmission module 120, which is operably coupled to, and adapted to be in communication with, the vehicle control unit 110, includes a transmitter 155 and a receiver 160. In some embodiments, one or the other of the transmitter 155 and the receiver 160 may be omitted according to the particular application for which the data transmission module 120 is to be used. In some embodiments, the transmitter 155 and the receiver 160 are combined into a transceiver capable of both sending and receiving wireless signals. In any case, the transmitter 155 and the receiver 160 are adapted to send/receive data to/from the cellular network 125, as indicated by arrow(s) 165.

In some embodiments, as in FIG. 2, the operational equipment engine 130, which is operably coupled to, and adapted to be in communication with, the vehicle control unit 110, includes a plurality of devices configured to facilitate driving of the vehicle 105. In this regard, the operational equipment engine 130 may be designed to exchange communication with the vehicle control unit 110, so as to not only receive instructions, but to provide information regarding the operation of the operational equipment engine 130. For example, the operational equipment engine 130 may include a vehicle battery 170, a motor 175 (e.g., electric or combustion), a drivetrain 180, a steering system 185, and a braking system 190. The vehicle battery 170 provides electrical power to the motor 175, which motor 175 drives the wheels 115e of the vehicle 105 via the drivetrain 180. In some embodiments, in addition to providing power to the motor 175, the vehicle battery 170 provides electrical power to other component(s) of the operational equipment engine 130, the vehicle control unit 110, the data transmission module 120, the sensor engine 135, the interface engine 140, or any combination thereof.

In some embodiments, as in FIG. 2, the sensor engine 135, which is operably coupled to, and adapted to be in communication with, the vehicle control unit 110, includes devices such as sensors, meters, detectors, or other devices configured to measure or sense a parameter related to an operation of the vehicle 105, as will be described in further detail below. For example, the sensor engine 135 may include a data meter 195, a signal detector 200, a global positioning system 205, vehicle camera(s) 210, an airbag sensor 215, a braking sensor 220, an accelerometer 225, a speedometer 230, a tachometer 235, or any combination thereof. The sensors or other detection devices are generally configured to sense or detect activity, conditions, and circumstances in an area to which the device has access. Sub-components of the sensor engine 135 may be deployed at any operational area where readings regarding the driving of the vehicle 105 may be taken. Readings from the sensor engine 135 are fed back to the vehicle control unit 110. The reported data may include sensed data, or may be derived, calculated, or inferred from the sensed data. The vehicle control unit 110 may send signals to the sensor engine 135 to adjust the calibration or operating parameters of the sensor engine 135 in accordance with a control program in the vehicle control unit 110. The vehicle control unit 110 is adapted to receive and process data from the sensor engine 135 or from other suitable source(s), and to monitor, store (e.g., in the memory 150), and/or otherwise process (e.g., using the processor 145) the received data.

The data meter 195 is adapted to communicate with the data transmission module 120 (or vice versa), as indicated by arrow 196, and to track the amount of data flowing through the transmission extender 120. For example, the data meter 195 may be adapted to communicate with the data transmission module 120 (or vice versa) via near field communication (NFC), radio-frequency identification (RFID), Bluetooth, infrared, proximity inference via, for example, a global positioning system (e.g., the global positioning system 205) or triangulation, other indirect technologies, and/or any combination thereof. In some embodiments, in addition to, or instead of, the data meter 195 communicating with the data transmission module 120 (or vice versa), the data meter 195 and the data transmission module 120 each communicate with the vehicle control unit 110. In some embodiments, the data meter 195 is or includes software stored in the memory 150 and executable by the processor 145 of the vehicle control unit 110 to track the amount of data flowing through the transmission extender 120. The signal detector 200 is adapted to detect the presence or absence of a mobile device in or around the vehicle 105 (e.g., via low frequency mobile phone signals). In some embodiments, when such a mobile device (e.g., the mobile device 250) is detected by the signal detector 200, the data transmission module 120 is used to extend cellular network coverage to the detected mobile device.

The global positioning system 205 is adapted to track the location of the vehicle 105 and to communicate the location information to the vehicle control unit 110. The vehicle camera(s) 210 are adapted to monitor the vehicle 105's surroundings and to communicate image data to the vehicle control unit 110. The airbag sensor 215 is adapted to activate and/or detect deployment of the vehicle 105's airbag(s) and to communicate the airbag deployment information to the vehicle control unit 110. The braking sensor 220 is adapted to monitor usage of the vehicle 105's braking system 190 (e.g., an antilock braking system 190) and to communicate the braking information to the vehicle control unit 110. The accelerometer 225 is adapted to monitor acceleration of the vehicle 105 and to communicate the acceleration information to the vehicle control unit 110. The accelerometer 225 may be, for example, a two-axis accelerometer 225 or a three-axis accelerometer 225. In some embodiments, the accelerometer 225 is associated with an airbag of the vehicle 105 to trigger deployment of the airbag. The speedometer 230 is adapted to monitor speed of the vehicle 105 and to communicate the speed information to the vehicle control unit 110. In some embodiments, the speedometer 230 is associated with a display unit of the vehicle 105 such as, for example, a display unit of the interface engine 140, to provide a visual indication of vehicle speed to a driver of the vehicle 105. The tachometer 235 is adapted to monitor the working speed (e.g., in revolutions-per-minute) of the vehicle 105's motor 175 and to communicate the angular velocity information to the vehicle control unit 110. In some embodiments, the tachometer 235 is associated with a display unit of the vehicle 105 such as, for example, a display unit of the interface engine 140, to provide a visual indication of the motor 175's working speed to the driver of the vehicle 105.

In some embodiments, as in FIG. 2, the interface engine 140, which is operably coupled to, and adapted to be in communication with, the vehicle control unit 110, includes at least one input and output device or system that enables a user to interact with the vehicle control unit 110 and the functions that the vehicle control unit 110 provides. For example, the interface engine 140 may include a display unit 240 and an input/output ("I/O") device 245. The display unit 240 may be, include, or be part of multiple display units. For example, in some embodiments, the display unit 240 may include one, or any combination, of a central display unit associated with a dash of the vehicle 105, an instrument cluster display unit associated with an instrument cluster of the vehicle 105, and/or a heads-up display unit associated with the dash and a windshield of the vehicle 105; accordingly, as used herein the reference numeral 240 may refer to one, or any combination, of the display units. The I/O device 245 may be, include, or be part of a communication port (e.g., a USB port), a Bluetooth communication interface, a touch-screen display unit, soft keys associated with a dash, a steering wheel, or another component of the vehicle 105, and/or similar components. Other examples of sub-components that may be part of the interface engine 140 include, but are not limited to, audible alarms, visual alerts, tactile alerts, telecommunications equipment, and computer-related components, peripherals, and systems.

In some embodiments, a mobile device 250 belonging to an occupant (or passerby) of the vehicle 105 may be coupled to, and adapted to be in communication with, the data transmission module 120. For example, the mobile device 250 may communicate wirelessly with the data transmission module 120, as indicated by arrow 252. For another example, the mobile device 250 may communicate with the data transmission module 120 via the interface engine 140 (e.g., the I/O device 245) and the vehicle control unit 110. As a result, the mobile device 250 is able to receive cellular network service (e.g., 5G or the like) through the data transmission module 120 in situations where the mobile device 250 is beyond the range of a service provider's stationary base stations, as will be described in further detail below. Moreover, as discussed above, the signal detector 200 may be adapted to detect the presence or absence of the mobile device 250 in or around the vehicle 105. In an embodiment, the mobile device 250 is a handheld or otherwise portable device which is carried onto the vehicle 105 by a user who is a driver or a passenger on the vehicle 105. In addition, or instead, the mobile device 250 may be removably connectable to the vehicle 105, such as by temporarily attaching the mobile device 250 to the dash, a center console, a seatback, or another surface in the vehicle 105. In another embodiment, the mobile device 250 may be permanently installed in the vehicle 105. In some embodiments, the mobile device 250 is, includes, or is part of one or more computing devices such as personal computers, personal digital assistants, cellular devices, mobile telephones, wireless devices, handheld devices, laptops, audio devices, tablet computers, game consoles, cameras, and/or any other suitable devices. In several embodiments, the mobile device 250 is a smartphone such as, for example, an iPhone® by Apple Inc.

Figure 3:
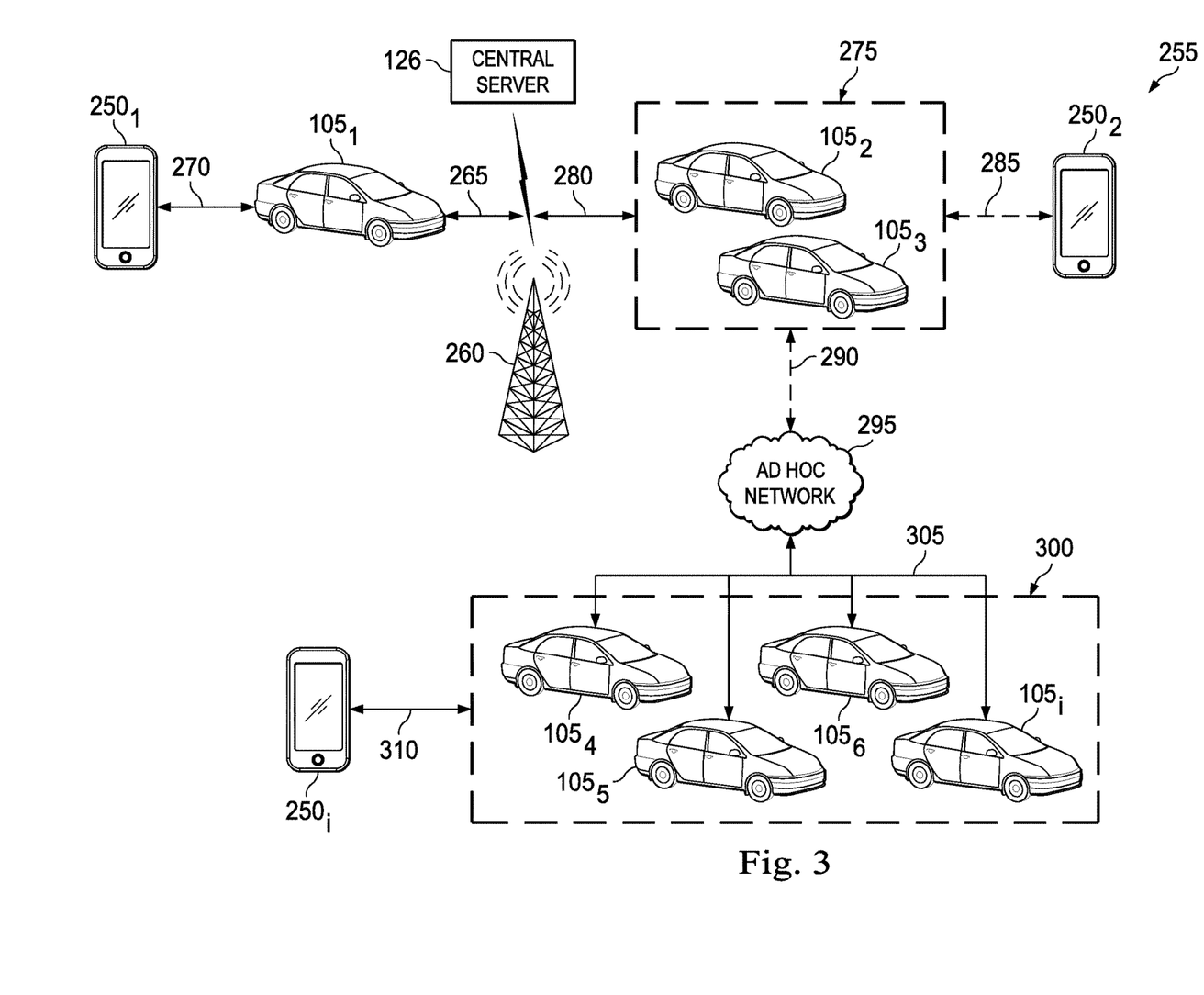
FIG. 3 is a diagrammatic illustration of a vehicle-based transmission extender system including at least the vehicle-based transmission extender apparatus of FIGS. 1 and 2, according to one or more embodiments of the present disclosure.

Referring to FIG. 3, in an embodiment, a vehicle-based data transmission extender system is generally referred to by the reference numeral 255 and includes several components of the vehicle-based data transmission extender apparatus 100. More particularly, the vehicle-based data transmission extender system 255 includes a plurality of vehicles substantially identical to the vehicle 105 of the vehicle-based data transmission extender apparatus 100, which vehicles are given the same reference numeral 105, except that a subscript 1, 2, 3, 4, 5, 6, or i is added to each as a suffix. In addition, the vehicle-based data transmission extender system 255 includes a plurality of mobile devices identical to the mobile device 250 of the vehicle-based data transmission extender apparatus 100, which mobile devices are given the same reference numeral 250, except that a subscript 1, 2, or i is added to each as a suffix.

In some embodiments, as in FIG. 3, the vehicle-based data transmission extender system 255 includes the vehicle $105_1$, whose current location is in the vicinity of the mobile device $250_1$. For example, the mobile device $250_1$ may be located in or around the vehicle $105_1$. The data transmission module 120 of the vehicle $105_1$ is adapted to communicate with a fixed base station 260 of the cellular network 125 (e.g., a 5G network), as indicated by arrow 265. Moreover, the mobile device $250_1$ is adapted to obtain access to the cellular network 125, as indicated by arrow 270, via the data transmission module 120 of the vehicle $105_1$; at least during such access to the cellular network 125 by the mobile device $250_1$, the data meter 195 of the vehicle $105_1$ is adapted to track the amount of data flowing through the data transmission module 120 of the vehicle $105_1$. In some embodiments, the data transmission module 120 of the vehicle $105_1$ extends the range of the cellular network 125 beyond that of the fixed base station 260 alone so that the mobile device $250_1$ is able to obtain access to the (otherwise out-of-range) cellular network 125. In some embodiments, the data transmission module 120 is used to extend cellular network coverage to the mobile device $250_1$ only in response to the detection of the mobile device $250_1$ by the vehicle $105_1$'s signal detector 200.

In some embodiments, as in FIG. 3, the vehicle-based data transmission extender system 255 also includes the vehicles $105_{2-3}$, which form a vehicle group 275 whose current location is in the vicinity of the mobile device $250_2$. For example, the mobile device $250_2$ may be located in or around one of the vehicles $105_{2-3}$. One or more of the data transmission modules 120 of the vehicles $105_{2-3}$ in the vehicle group 275 are adapted to communicate with the fixed base station 260 of the cellular network 125, as indicated by arrow 280. Moreover, the mobile device $250_2$ is adapted to obtain access to the cellular network 125, as indicated by arrow 285, via the one or more of the data transmission modules 120 of the vehicles $105_{2-3}$ in the vehicle group 275; at least during such access to the cellular network 125 by the mobile device $250_2$, one or more of the data meters 195 of the vehicles $105_{2-3}$ are adapted to track the amount of data flowing through the corresponding one or more of the data transmission modules 120. In addition, the vehicles $105_{2-3}$ may be adapted to communicate with one another via their respective data transmission modules 120, as indicated by arrow 290, so as to form an ad hoc network 295. In some embodiments, the one or more of the data transmission modules 120 of the vehicles $105_{2-3}$ extend the range of the cellular network 125 beyond that of the fixed base station 260 alone so that the mobile device $250_2$ is able to obtain access to the (otherwise out-of-range) cellular network 125. In some embodiments, the one or more of the data transmission modules 120 of the vehicles $105_{2-3}$ is/are used to extend cellular network coverage to the mobile device $250_2$ only in response to the detection of the mobile device $250_2$ by one or more of the signal detectors 200 of the vehicles $105_{2-3}$.

In some embodiments, as in FIG. 3, the vehicle-based data transmission extender system 255 also includes the vehicles $105_{4-i}$, which form a vehicle group 300 whose current location is in the vicinity of the mobile device $250_i$. For example, the mobile device $250_i$ may be located in or around one of the vehicles $105_{4-i}$. One or more of the data transmission modules 120 of the vehicles $105_{4-i}$ in the vehicle group 300 may be adapted to communicate with one another via their respective data transmission modules 120, as indicated by arrow 305, so as to form an ad hoc network. In this regard, if the physical distance between the vehicle groups 275 and 300 is close enough to permit direct vehicle-to-vehicle communication therebetween, the vehicles $105_{2-i}$ may be adapted to communicate with one another via their respective data transmission modules 120, so as to form the ad hoc network 295. The mobile device $250_i$ is adapted to obtain access to the cellular network 125, as indicated by arrow 310, via the one or more of the data transmission modules 120 of the vehicles $105_{4-i}$ in the vehicle group 300; at least during such access to the cellular network 125 by the mobile device $250_i$, one or more of the data meters 195 of the vehicles $105_{4-i}$ are adapted to track the amount of data flowing through the corresponding one or more of the data transmission modules 120. In some embodiments, the one or more of the data transmission modules 120 of the vehicles $105_{4-i}$ extend the range of the cellular network 125 beyond that of the fixed base station 260 and the one or more data transmission modules 120 of the vehicles $105_{2-3}$ so that the mobile device $250_i$ is able to obtain access to the (otherwise out-of-range) cellular network 125. In some embodiments, the one or more of the data transmission modules 120 of the vehicles $105_{4-i}$ are used to extend cellular network coverage to the mobile device $250_i$ only in response to the detection of the mobile device $250_i$ by one or more of the signal detectors 200 of the vehicles $105_{4-i}$.

In some embodiments, as in FIG. 3, the vehicle-based data transmission extender system 255 also includes the central server 126, which is adapted to send and/or receive data to/from one or more of the vehicles $105_{1-i}$ via the cellular network 125, the ad hoc network 295, or any combination thereof. In some embodiments, the central server 126 is adapted to receive tracking data pertaining to the amount of data flowing through each the data transmission modules 120 of the one or more of the vehicles $105_{1-i}$; this tracking data may be used to charge usage fees. In some embodiments, at least some of the vehicles $105_{1-i}$ are equipped with the data transmission module 120, and at least some the vehicles $105_{1-i}$ are not equipped the data transmission module 120. Accordingly, the central server 126 may also be used to construct comprehensive profiles based on: (i) detected usage of the mobile devices $250_{1-i}$ in the vehicles $105_{1-i}$ using the respective signal detectors 200 of the vehicles $105_{1-i}$; (ii) the vehicles $105_{1-i}$ equipped with the data transmission module 120 and thus able to extend coverage of the cellular network 125 to the detected mobile devices $250_{1-i}$; (iii) the vehicles $105_{1-i}$ not equipped the data transmission module 120 and thus unable to extend coverage of the cellular network 125 to the detected mobile devices $250_{1-i}$; and (iv) known dead spots in the cellular network 125 (i.e., locations or geographic zones where the fixed base station 260 does not provide coverage).

Based on these comprehensive profiles, the central server 126 is capable of identifying trends for instances where one or more of the vehicles $105_{1-i}$ equipped with the data transmission module 120 (and thus able to extend coverage of the cellular network 125 to the detected mobile devices $250_{1-i}$) can constructively impart, extend, and/or add network connectivity when one or more of the mobile devices $250_{1-i}$ are detected. In some embodiments, the provided network connectivity temporarily adds more network bandwidth in a cellular dead spot at a frequency commonly shared between the one or more of the detected mobile devices mobile devices $250_{1-i}$ and the one or more of the vehicles $105_{1-i}$ equipped with the data transmission module 120. Machine learning may be further leveraged by the central server 126 to determine how effectively particular vehicle(s) $105_{1-i}$ equipped with the data transmission module 120 add network bandwidth in the cellular dead spot; based on the effectiveness (or lack thereof) of the particular vehicle(s) $105_{1-i}$ at adding network bandwidth, the (machine learning) central server 126 may be validated or refined to select for use appropriate vehicle(s) $105_{1-i}$ equipped with the data transmission module 120 from among the plurality of vehicles $105_{1-i}$.

Figure 4:
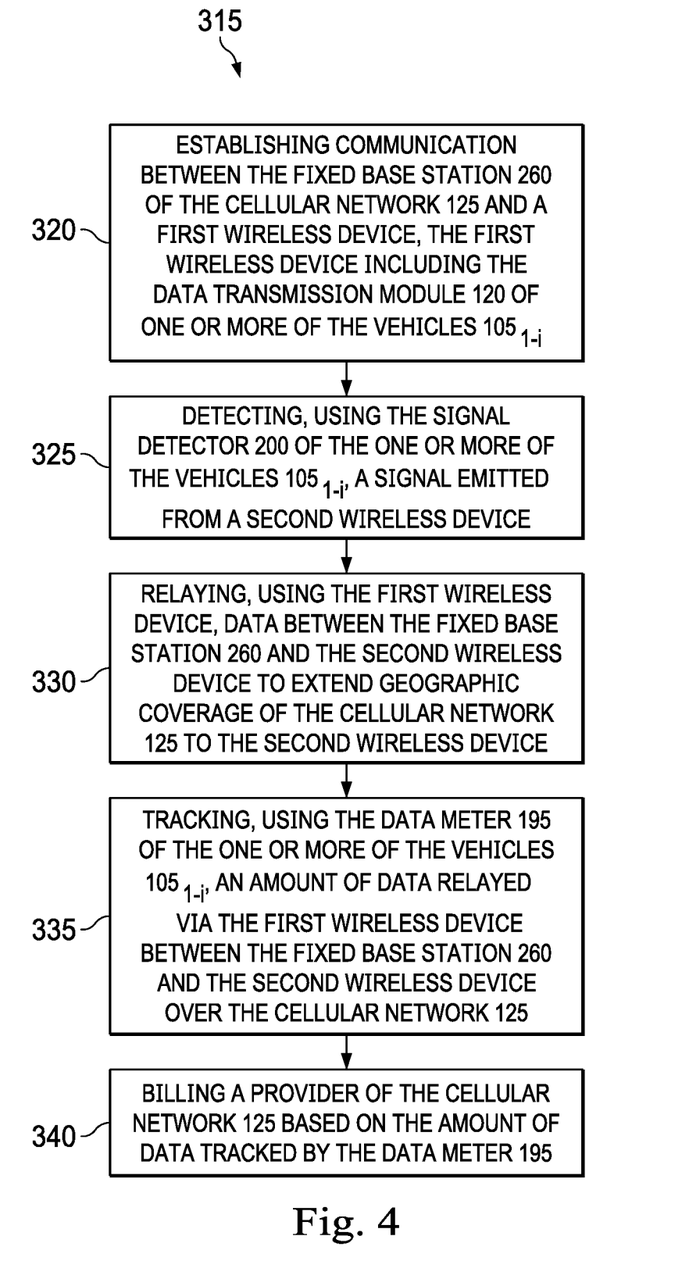
FIG. 4 is a flow diagram of a method for implementing one or more embodiments of the present disclosure.

Referring to FIG. 4, a method of using the vehicle-based data transmission extender system 255 is generally referred to by the reference numeral 315. The method 315 may be executed in response to one or more of the mobile devices $250_{1-i}$ moving out-of-range to the fixed base station 260. The method 315 includes at a step 320, establishing communication between the fixed base station 260 of the cellular network 125 and a first wireless device, the first wireless device including the data transmission module 120 of one or more of the vehicles $105_{1-i}$. In some embodiments, the cellular network 125 is a 5G cellular network. In some embodiments, the step 320 includes: establishing communication between the fixed base station 260 of the cellular network 125 and a third wireless device; and relaying, using the third wireless device, data between the fixed base station 260 and the first wireless device. In at least one such embodiment, the third wireless device includes the data transmission module 120 of another one or more of the vehicles $105_{1-i}$. At a step 325, a signal emitted from a second wireless device is detected using the signal detector 200 of the one or more of the vehicles $105_{1-i}$. In some embodiments, the second wireless device includes the data transmission module 120 of yet another one or more of the vehicles $105_{1-i}$. In other embodiments, the second wireless device includes one or more of the mobile devices $250_{1-i}$ located in or around the one or more of the vehicles $105_{1-i}$. At a step 330, data is relayed, using the first wireless device, between the fixed base station 260 and the second wireless device to extend geographic coverage of the cellular network 125 to the second wireless device. In some embodiments, the step 330 is executed in response to the step 325. In some embodiments, the step 330 includes: relaying, using the first wireless device, data between the third wireless device and the second wireless device. At a step 335, an amount of data relayed via the first wireless device between the fixed base station 260 and the second wireless device over the cellular network 125 is tracked using the data meter 195 of the one or more of the vehicles $105_{1-i}$. At a step 340, a provider of the cellular network 125 is billed based on the amount of data tracked by the data meter 195.

In some embodiments, among other things, the operation of the vehicle-based data transmission extender system 255 and/or the execution of the method 315: improves poor coverage and/or blockage issues otherwise experienced by customers of existing cellular networks; decreases the occurrence of cellular dead spots; provides additional and closer placed base stations (i.e., the data transmission modules 120) to provide improved service coverage (e.g., 5G cellular coverage); extends the coverage of one or more cellular networks to remote areas where data service is not as prevalent; and/or provides better cellular data service in high-blockage areas.

Figure 5:
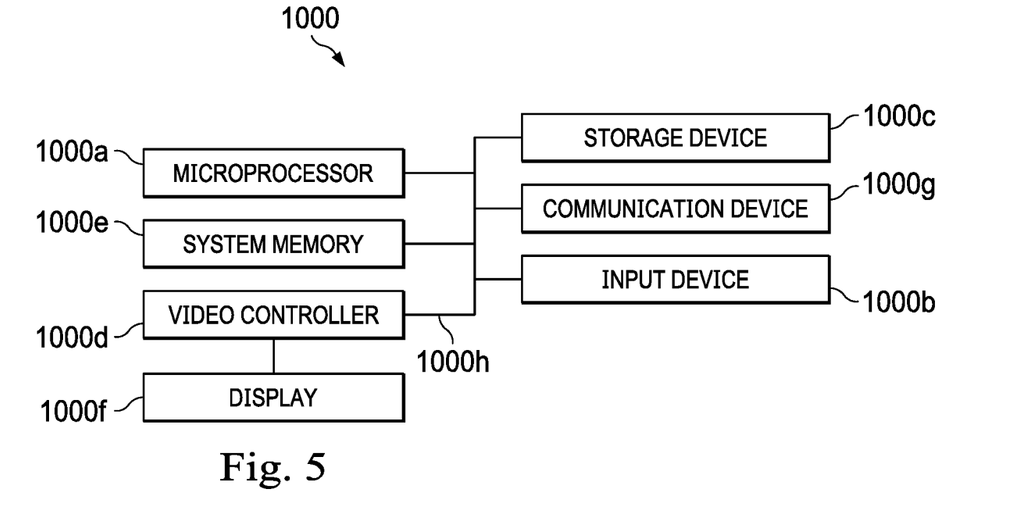
FIG. 5 is a diagrammatic illustration of a computing node for implementing one or more embodiments of the present disclosure.

Referring to FIG. 5, in an embodiment, a computing node 1000 for implementing one or more embodiments of one or more of the above-described elements, control units (e.g., 110), apparatus (e.g., 100), systems (e.g., 255), methods (e.g., 315) and/or steps (e.g., 320, 325, 330, 335, and/or 340), or any combination thereof, is depicted. The node 1000 includes a microprocessor 1000a, an input device 1000b, a storage device 1000c, a video controller 1000d, a system memory 1000e, a display 1000f, and a communication device 1000g all interconnected by one or more buses 1000h. In several embodiments, the storage device 1000c may include a floppy drive, hard drive, CD-ROM, optical drive, any other form of storage device or any combination thereof. In several embodiments, the storage device 1000c may include, and/or be capable of receiving, a floppy disk, CD-ROM, DVD-ROM, or any other form of computer-readable medium that may contain executable instructions. In several embodiments, the communication device 1000g may include a modem, network card, or any other device to enable the node 1000 to communicate with other nodes. In several embodiments, any node represents a plurality of interconnected (whether by intranet or Internet) computer systems, including without limitation, personal computers, mainframes, PDAs, smartphones and cell phones.

In several embodiments, one or more of the components of any of the above-described systems include at least the node 1000 and/or components thereof, and/or one or more nodes that are substantially similar to the node 1000 and/or components thereof. In several embodiments, one or more of the above-described components of the node 1000 and/or the above-described systems include respective pluralities of same components.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random-access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, database may be any standard or proprietary database software. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described elements, control units (e.g., 110), apparatus (e.g., 100), systems (e.g., 255), methods (e.g., 315) and/or steps (e.g., 320, 325, 330, 335, and/or 340), or any combination thereof. In several embodiments, such a processor may include one or more of the microprocessor 1000a, any processor(s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

A method has been disclosed. The method generally includes establishing communication between a fixed base station of a cellular network and a first wireless device; and relaying, using the first wireless device, data between the fixed base station and a second wireless device to extend geographic coverage of the cellular network to the second wireless device; wherein the first wireless device includes a first vehicle-based data transmission module that is part of a first vehicle; and wherein the method further includes at least one of: detecting, using a signal detector, a signal emitted from the second wireless device, the signal detector being part of the first vehicle; and tracking, using a data meter, an amount of data relayed via the first wireless device between the fixed base station and the second wireless device over the cellular network, the data meter being part of the first vehicle.

The foregoing method embodiment may include one or more of the following elements, either alone or in combination with one another:

- The second wireless device includes a second vehicle-based data transmission module that is part of a second vehicle.
- The method includes the step of detecting, using the signal detector, the signal emitted from the second wireless device; and at least the step of relaying, using the first wireless device, the data between the fixed base station and the second wireless device is executed in response to the step of detecting, using the signal detector, the signal emitted from the second wireless device.
- The second wireless device includes a mobile device located in or around the first vehicle.
- The method includes the step of tracking, using the data meter, the amount of data relayed via the first wireless device between the fixed base station and the second wireless device over the cellular network; and the method further includes billing a provider of the cellular network based on the amount of data tracked by the data meter.
- The cellular network is a 5G cellular network.
- The step of establishing communication between the fixed base station of the cellular network and the first wireless device includes: establishing communication between the fixed base station of the cellular network and a third wireless device; and relaying, using the third wireless device, data between the fixed base station and the first wireless device; the step of relaying, using the first wireless device, the data between the fixed base station and the second wireless device includes: relaying, using the first wireless device, data between the third wireless device and the second wireless device; and the third wireless device includes a second vehicle-based data transmission module that is part of a second vehicle.

A system has also been disclosed. The system generally includes a fixed base station of a cellular network; a first wireless device including a first vehicle-based data transmission module that is part of a first vehicle, the first wireless device being adapted to: communicate with the fixed base station; and relay data between the fixed base station and a second wireless device to extend geographic coverage of the cellular network to the second wireless device; the second wireless device; and at least one of: a signal detector adapted to detect a signal emitted from the second wireless device, the signal detector being part of the first vehicle; and a data meter adapted to track an amount of data relayed via the first wireless device between the fixed base station and the second wireless device over the cellular network, the data meter being part of the first vehicle.

The foregoing system embodiment may include one or more of the following elements, either alone or in combination with one another:

- The second wireless device includes a second vehicle-based data transmission module that is part of a second vehicle.
- The system includes the signal detector; and the first wireless device is adapted to relay the data between the fixed base station and the second wireless device in response to the signal detector detecting the signal emitted from the second wireless device.
- The second wireless device includes a mobile device located in or around the first vehicle.
- The system includes the data meter; and the data meter is further adapted to bill a provider of the cellular network based on the amount of data tracked by the data meter.
- The cellular network is a 5G cellular network.
- The system further includes a third wireless device adapted to communicate with the fixed base station and to relay data between the fixed base station and the first wireless device; wherein the first wireless device is adapted to communicate with the fixed base station via the third wireless device and to relay the data between the fixed base station and the second wireless device via the third wireless device; and wherein the third wireless device includes a second vehicle-based data transmission module that is part of a second vehicle.

An apparatus has also been disclosed. The apparatus generally includes a non-transitory computer readable medium; and a plurality of instructions stored on the non-transitory computer readable medium and executable by one or more processors, the plurality of instructions including: instructions that, when executed, cause the one or more processors to establish communication between a fixed base station of a cellular network and a first wireless device; and instructions that, when executed, cause the one or more processors to relay, using the first wireless device, data between the fixed base station and a second wireless device to extend geographic coverage of the cellular network to the second wireless device; wherein the first wireless device includes a first vehicle-based data transmission module that is part of a first vehicle; and wherein the plurality of instructions further include at least one of: instructions that, when executed, cause the one or more processors to detect, using a signal detector, a signal emitted from the second wireless device, the signal detector being part of the first vehicle; and instructions that, when executed, cause the one or more processors to track, using a data meter, an amount of data relayed via the first wireless device between the fixed base station and the second wireless device over the cellular network, the data meter being part of the first vehicle.

The foregoing apparatus embodiment may include one or more of the following elements, either alone or in combination with one another:

- The second wireless device includes a second vehicle-based data transmission module that is part of a second vehicle.
- The plurality of instructions include the instructions that, when executed, cause the one or more processors to detect, using the signal detector, the signal emitted from the second wireless device; and the instructions that, when executed, cause the one or more processors to relay, using the first wireless device, data between the fixed base station and the second wireless device are executed in response to the instructions that, when executed, cause the one or more processors to detect, using the signal detector, the signal emitted from the second wireless device.
- The second wireless device includes a mobile device located in or around the first vehicle.

The plurality of instructions include the instructions that, when executed, cause the one or more processors to track, using the data meter, the amount of data relayed via the first wireless device between the fixed base station and the second wireless device over the cellular network; the plurality of instructions further include instructions that, when executed, cause the one or more processors to bill a provider of the cellular network based on the amount of data tracked by the data meter; and the cellular network is a 5G cellular network.

The instructions that, when executed, cause the one or more processors to establish communication between the fixed base station of the cellular network and the first wireless device include: instructions that, when executed, cause the one or more processors to establish communication between the fixed base station of the cellular network and a third wireless device; and instructions that, when executed, cause the one or more processors to relay, using the third wireless device, data between the fixed base station and the first wireless device; the instructions that, when executed, cause the one or more processors to relay, using the first wireless device, the data between the fixed base station and the second wireless device include: instructions that, when executed, cause the one or more processors to relay, using the first wireless device, data between the third wireless device and the second wireless device; and the third wireless device includes a second vehicle-based data transmission module that is part of a second vehicle.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously and/or sequentially. In some embodiments, the steps, processes, and/or procedures may be merged into one or more steps, processes and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims.

What is claimed is:

1. A method, comprising:
    detecting, using a first signal detector that is part of a first vehicle, a first signal emitted from a first mobile device located in or around the first vehicle;
    establishing communication between a fixed base station of a cellular network and a first data transmission module that is part of the first vehicle;
    relaying, using the first data transmission module of the first vehicle, data between the fixed base station of the cellular network and the first mobile device to extend geographic coverage of the cellular network to the first mobile device;
    tracking, using a first data meter that is part of the first vehicle, a first amount of data relayed via the first data transmission module between the fixed base station and the first mobile device;
    detecting, using a second signal detector that is part of a second vehicle, a second signal emitted from a second mobile device located in or around the second vehicle;
    establishing communication between the first data transmission module of the first vehicle and a second data transmission module that is part of the second vehicle;
    relaying, using the second data transmission module of the second vehicle, data between the first data transmission module of the first vehicle and the second mobile device to extend geographic coverage of the cellular network to the second mobile device; and
    tracking, using a second data meter that is part of the second vehicle, a second amount of data relayed via the second data transmission module between the first data transmission module of the first vehicle and the second mobile device.

2. The method of claim 1,
    wherein at least the step of relaying, using the first data transmission module of the first vehicle, the data between the fixed base station and the first mobile device is executed in response to the step of detecting, using the first signal detector of the first vehicle, the first signal emitted from the first mobile device; and/or
    wherein at least the step of relaying, using the second data transmission module of the second vehicle, the data between the first data transmission module of the first vehicle and the second mobile device is executed in response to the step of detecting, using the second signal detector of the second vehicle, the second signal emitted from the second mobile device.

3. The method of claim 1,
    wherein the step of relaying, using the first data transmission module of the first vehicle, the data between the fixed base station and the first mobile device comprises communicating the data from the first data transmission module of the first vehicle to the first mobile device via a first interface engine that is part of the first vehicle; and/or
    wherein the step of relaying, using the second data transmission module of the second vehicle, the data between the first data transmission module of the first vehicle and the second mobile device comprises communicating the data from the second data transmission module of the second vehicle to the second mobile device via a second interface engine that is part of the second vehicle.

4. The method of claim 1,
wherein the method further comprises communicating the first amount of data tracked by the first data meter of the first vehicle to a central server; and/or
wherein the method further comprises communicating the second amount of data tracked by the second data meter of the second vehicle to the central server.

5. The method of claim 4,
wherein the method further comprises billing a provider of the cellular network based on the first amount of data tracked by the first data meter of the first vehicle and communicated to the central server; and/or
wherein the method further comprises billing a provider of the cellular network based on the second amount of data tracked by the second data meter of the second vehicle and communicated to the central server.

6. The method of claim 5, wherein the cellular network is a 5G cellular network.

7. A system, comprising:
a first vehicle, comprising:
a first signal detector adapted to detect a first signal emitted from a first mobile device located in or around the first vehicle;
a first data transmission module adapted to:
communicate with a fixed base station of a cellular network; and
relay data between the fixed base station and the first mobile device to extend geographic coverage of the cellular network to the first mobile device; and
a first data meter adapted to track a first amount of data relayed via the first data transmission module between the fixed base station and the first mobile device;
a second vehicle, comprising:
a second signal detector adapted to detect a second signal emitted from a second mobile device located in or around the second vehicle;
a second data transmission module adapted to:
communicate with the first data transmission module of the first vehicle; and
relay data between the first data transmission module of the first vehicle and the second mobile device to extend geographic coverage of the cellular network to the second mobile device; and
a second data meter adapted to track a second amount of data relayed via the second data transmission module between the first data transmission module of the first vehicle and the second mobile device.

8. The system of claim 7,
wherein the first data transmission module of the first vehicle is adapted to relay the data between the fixed base station and the first mobile device in response to the first signal detector detecting the first signal emitted from the first mobile device; and/or
wherein the second data transmission module of the second vehicle is adapted to relay the data between the first data transmission module of the first vehicle and the second mobile device in response to the second signal detector detecting the second signal emitted from the second mobile device.

9. The system of claim 7,
wherein the first vehicle further comprises a first interface engine, and the first data transmission module of the first vehicle is adapted to relay data between the fixed base station and the first mobile device by communicating the data from the first data transmission module of the first vehicle to the first mobile device via the first interface engine; and/or
wherein the second vehicle further comprises a second interface engine, and the second data transmission module of the second vehicle is adapted to relay the data between the first data transmission module of the first vehicle and the second mobile device by communicating the data from the second data transmission module of the second vehicle to the second mobile device via the second interface engine.

10. The system of claim 7, further comprising a central server;
wherein the first amount of data tracked by the first data meter of the first vehicle is adapted to be communicated to the central server; and/or
wherein the second amount of data tracked by the second data meter of the second vehicle is adapted to be communicated to the central server.

11. The system of claim 10,
wherein the central server is adapted to bill a provider of the cellular network based on the first amount of data tracked by the first data meter of the first vehicle and communicated to the central server; and/or
wherein the central server is adapted to bill a provider of the cellular network based on the second amount of data tracked by the second data meter of the second vehicle and communicated to the central server.

12. The system of claim 11, wherein the cellular network is a 5G cellular network.

13. An apparatus, comprising:
a non-transitory computer readable medium; and
a plurality of instructions stored on the non-transitory computer readable medium and executable by one or more processors, the plurality of instructions comprising:
instructions that, when executed, cause the one or more processors to detect, using a first signal detector that is part of a first vehicle, a first signal emitted from a first mobile device located in or around the first vehicle;
instructions that, when executed, cause the one or more processors to establish communication between a fixed base station of a cellular network and a first data transmission module that is part of the first vehicle;
instructions that, when executed, cause the one or more processors to relay, using the first data transmission module of the first vehicle, data between the fixed base station of the cellular network and the first mobile device to extend geographic coverage of the cellular network to the first mobile device;
instructions that, when executed, cause the one or more processors to track, using a first data meter that is part of the first vehicle, a first amount of data relayed via the first data transmission module between the fixed base station and the first mobile device;
instructions that, when executed, cause the one or more processors to detect, using a second signal detector that is part of a second vehicle, a second signal emitted from a second mobile device located in or around the second vehicle;

instructions that, when executed, cause the one or more processors to establish communication between the first data transmission module of the first vehicle and a second data transmission module that is part of the second vehicle;

instructions that, when executed, cause the one or more processors to relay, using the second data transmission of the second vehicle, data between the first data transmission module of the first vehicle and the second mobile device to extend geographic coverage of the cellular network to the second mobile device; and instructions that, when executed, cause the one or more processors to track, using a second data meter that is part of the second vehicle, a second amount of data relayed via the second data transmission module between the first data transmission module of the first vehicle and the second mobile device.

14. The apparatus of claim 13,
wherein the instructions that, when executed, cause the one or more processors to relay, using the first data transmission module of the first vehicle, the data between the fixed base station of the cellular network and the first mobile device are executed in response to the instructions that, when executed, cause the one or more processors to detect, using the first signal detector of the first vehicle, the first signal emitted from the first mobile device; and/or
wherein the instructions that, when executed, cause the one or more processors to relay, using the second data transmission module of the second vehicle, the data between the first data transmission module of the first vehicle and the second mobile device are executed in response to the instructions that, when executed, cause the one or more processors to detect, using the second signal detector of the second vehicle, the second signal emitted from the second mobile device.

15. The apparatus of claim 13,
wherein the instructions that, when executed, cause the one or more processors to relay, using the first data transmission module of the first vehicle, the data between the fixed base station and the first mobile device comprise instructions that, when executed, cause the one or more processors to communicate the data from the first data transmission module of the first vehicle to the first mobile device via a first interface engine that is part of the first vehicle; and/or
wherein the instructions that, when executed, cause the one or more processors to relay, using the second data transmission module of the second vehicle, the data between the first data transmission module of the first vehicle and the second mobile device comprise instructions that, when executed, cause the one or more processors to communicate the data from the second data transmission module of the second vehicle to the second mobile device via a second interface engine that is part of the second vehicle.

16. The apparatus of claim 13,
wherein the plurality of instructions further comprises instructions that, when executed, cause the one or more processors to communicate the first amount of data tracked by the first data meter of the first vehicle to a central server; and/or
wherein the plurality of instructions further comprises instructions that, when executed, cause the one or more processors to communicate the second amount of data tracked by the second data meter of the second vehicle to the central server.

17. The apparatus of claim 16,
wherein the plurality of instructions further comprises instructions that, when executed, cause the one or more processors to bill a provider of the cellular network based on the first amount of data tracked by the first data meter of the first vehicle and communicated to the central server; and/or
wherein the plurality of instructions further comprises instructions that, when executed, cause the one or more processors to bill a provider of the cellular network based on the second amount of data tracked by the second data meter of the second vehicle and communicated to the central server.

18. The apparatus of claim 13, wherein the cellular network is a 5G cellular network.

* * * * *